Patented July 3, 1928.

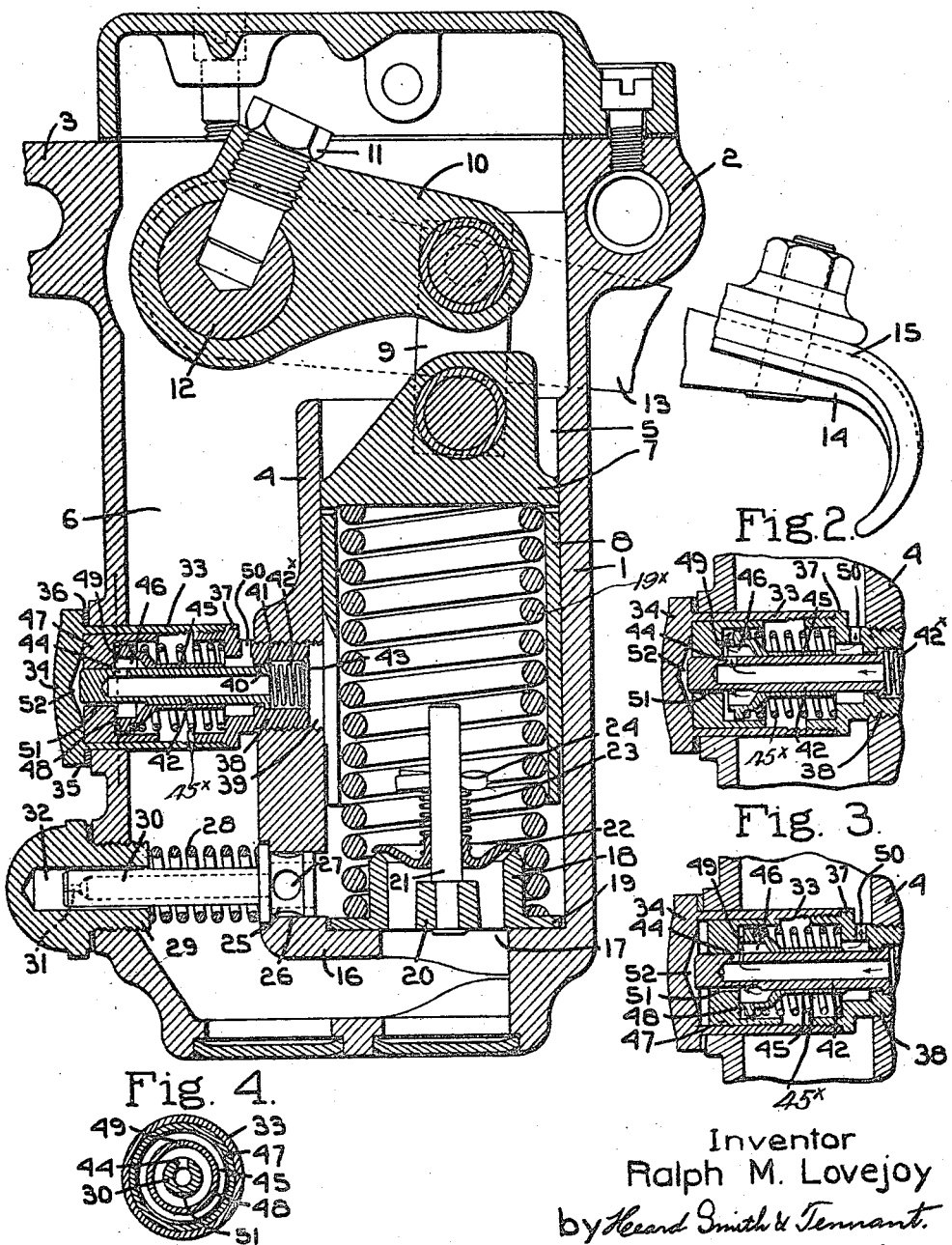

1,676,147

UNITED STATES PATENT OFFICE.

RALPH M. LOVEJOY, OF BOSTON, MASSACHUSETTS.

SHOCK ABSORBER.

Application filed May 29, 1926. Serial No. 112,433.

This invention relates to improvements in shock absorbers for cushioning the movement of two relatively movable members, and the object of the invention is to provide novel means for relieving the initial resistance of the shock absorber to sudden relative movements between said members.

More particularly the object of the invention is to provide means operable to relieve the initial resistance of the shock absorbers with means for progressively increasing the resistance offered by the shock absorbers to such relative movements during a predetermined period of time, and preferably thereafter to maintain such resistance substantially constant during further continued relative movement of said members.

The invention is disclosed herein as applied more particularly to shock absorbers of the hydraulic type used upon automobiles, which comprises a fluid-containing cylinder adapted to be connected to one of the relatively movable members such as the frame of an automobile, and a piston adapted to be connected to the other relatively movable member, such as the axle of an automobile, with means for admitting liquid freely to the pressure chamber of the cylinder during the movement of the piston in one direction, and means for restricting the flow of liquid from the cylinder during the movement of the piston in the other direction,—that is, during the compressive movement of the piston. Usually the means for thus restricting the flow of liquid from the cylinder during the compressive movement of the piston is in the form of a spring-controlled valve which requires considerable pressure in the cylinder to displace it from its seat. In the action of the shock absorbers, therefore, the initial movement of the piston is forcibly restricted, as the piston acts upon the incompressible body of liquid until the relief valve is displaced from its seat. The present invention contemplates the provision of means which will relieve the initial resistance of the shock absorbers caused by a sudden movement of the piston, resulting from the relative movements of the members, with means for gradually increasing the resistance offered by the fluid during continued movement of the piston for a predetermined period of time, and which preferably will thereafter offer a substantially constant resistance to further continued movement thereof. The invention is especially adapted to cushioning relatively slight movements of the piston, such as when an automobile is equipped with shock absorbers, in passing over a slightly rough road, in which the relative movements of the frame and axle are insufficient to displace the usual spring-actuated relief valve or otherwise to cause a sufficient flow of the liquid from the pressure chamber of the cylinder to produce the required shock absorber action,—as for example,—in shock absorbers which are not provided with relief valves, but in which sufficient clearance between the piston and cylinder walls is provided to permit a restricted flow of the liquid from the compression chamber past the piston.

The further object of this invention is to provide an initial-pressure relieving unit for a fluid chamber, such as the compression chamber of a shock absorber which can be readily applied to usual forms of shock absorbers and other devices without substantially modifying the structure of such devices. Other objects and features of this invention are more fully set down in the following description and the accompanying drawings, and will be pointed out particularly in the claims.

A preferred embodiment of the invention is illustrated in the accompanying drawings as applied to hydraulic shock absorbers of the "Lovejoy" type.

In the drawings—

Fig. 1 is a vertical longitudinal sectional view of the shock absorber illustrating the preferred form of the initial-pressure relieving device applied thereto.

Fig. 2 is a vertical sectional view of the initial-pressure relieving unit illustrating the movement of the spring-actuated sleeve valve when sudden pressure is applied by the piston to the liquid in the cylinder.

Fig. 3 is a similar view illustrating the movement of the annular valve which progressively restricts the flow of liquid from the cylinder during a predetermined period of time, and thereafter in cooperation with the sleeve valve maintains a substantially constant resistance to the flow of liquid from the cylinder.

Fig. 4 is a sectional view showing particularly the end of the sleeve valve and its relation to the port in the conduit through which liquid is forced from the cylinder during the initial movement of the piston.

The shock-absorber illustrated in the accompanying drawings comprises casing 1, having ears, 2 and 3, adapted to be secured by suitable bolts to one of the relatively movable members, such as the frame of a vehicle. The casing has an interior wall or partition 4, provided with a cylinder 5 and a reservoir 6 for the fluid, which preferably is a liquid such as oil of proper consistency. A piston 7 is reciprocably mounted in the cylinder, and as shown is provided with a cylindrical skirt 8, which tightly but slidably fits within the cylinder. The head of the piston is connected by links 9 to an arm 10 which is secured by a screw threaded stud 11 to a rock shaft 12, having an arm 13 located outside of the casing with a downwardly curved free end 14. A strap, not shown, is connected to the end 14 of the arm 13 by a suitable clamp 15 and is connected at its other end with a suitable bracket upon the axle of the vehicle. The lower end or head 16 of the cylinder is spaced apart from the lower end of the casing to provide an extension of the reservoir 6, and the cylinder head 16 is provided with a port 17, which leads to the cylinder. The port 17 is provided with a suitable valve adapted to permit the liquid to flow freely from the reservoir to the cylinder upon an upward or suction movement of the piston. The particular valve mechanism illustrated comprises an annular valve seat 18 having a flange 19 which rests upon the cylinder head. A spiral spring $19^x$ which is seated at its lower end upon the flange 19 of the valve seat and at its upper end engages the face of the piston, serves to retain the valve seat upon the cylinder head and also to press the piston upwardly with sufficient force to maintain the connection between the end of the arm 14 and the axle tight at all times. The valve seat 18 also has a transversely extending bar or spider 20, in which is seated a stud 21 upon which valve 22 is slidably mounted. The valve 22 is normally held upon its seat by a spiral spring 23 which is interposed between the valve and a suitable abutment upon the stud 21 such as a cotter pin 24 which passes through a suitable aperture in the stud.

In the construction illustrated the usual means for restricting the flow of liquid from the cylinder during the compressive movement of the piston is illustrated. This comprises a tubular valve 25 located within a lateral port 26 in the lower portion of the cylinder wall and provided with lateral ports 27 operable when the valve is pressed from its seat by the pressure upon the liquid in the cylinder to permit the liquid to flow from the cylinder through the ports 27 into the reservoir. The valve 25 is normally held seated by a spiral spring 28 which abuts at one end against the head of the valve and at its opposite end against a screw threaded hollow plug 29 which is seated in the wall of the casing. The stem 30 of the valve 26 desirably is chambered throughout the greater portion of its length, and the end of the valve stem is drilled to provide a restricted conduit 31 leading into a chamber 32 of the hollow plug. Sufficient clearance may be provided between the valve stem and the surrounding wall of the hollow plug to permit such liquid as flows through the valve stem to be freely discharged into the reservoir, or the clearance may be made so small that the liquid flowing through the conduit 31 into the chamber 32 will build up a resistance upon the end of the valve stem which will tend to force the valve toward its seat and thus supplement the action of the valve spring 28. The construction above described is that of the usual shock absorber of the "Lovejoy" type.

In the present invention, however, the usual relief valve 25 may be considered as a supplemental relief device which operates to control the flow of liquid from the cylinder and to restrain the speed of movement of the piston after, or in some instances concurrently with, the initial pressure relieving device forming the subject matter of the invention.

The initial pressure relieving device as heretofore mentioned comprises means operable to relieve the initial resistance of the liquid to the piston upon a sudden movement of the piston, with means acting thereupon for a predetermined period of time progressively to increase the resistance of the liquid to continued movement of the piston and thereafter preferably to maintain such increased resistance substantially constant during further movement of the piston, so that during such further movement the resistance of the liquid to the piston will be controlled by the usual relief valve 25.

The preferred form of initial-pressure relieving device which is illustrated here is in the form of a unit adapted to be applied not only to shock absorbers of the "Lovejoy" type which is illustrated herein, but to any form of shock absorber or pressure chamber in which it is desirable to relieve suddenly imposed pressures upon the fluid in the pressure chamber. As illustrated here the initial-pressure relieving device comprises a cylindrical casing 33 adapted to be inserted in the wall of a shock absorber casing and provided with an enlarged head 34, presenting a shoulder 35 adapted to be seated upon the casing, preferably with a suitable washer or packing 36 interposed therebetween. The opposite end of the cylinder casing 33 is internally screw threaded, and a nipple 37 having a screw threaded extension is secured thereto. The nipple is provided with a reduced screw threaded end portion 38 which engages a complementary screw threaded wall of a port 39 in the cylinder wall 4. The reduced end portion 38 of the nipple is centrally bored to communicate with the cylinder and is provided with an internally extending rib or shoulder 40 against which an annular flange 41 of a conduit 42 is seated, the flange 41 of the conduit being held in engagement with said wall by a spiral spring 42$^x$ which abuts at one end against said flange and at its opposite end against a ring or washer 43 which is swaged or otherwise secured in the end portion of the nipple. By reason of this a slightly flexible connection is provided which will prevent the binding of the relatively movable parts of the initial-pressure relieving mechanism as will hereinafter appear more fully.

The conduit 42 comprises a cylindrical tubular member having a closed end with one or more laterally extending ports 44 adjacent to its outer end.

A sleeve valve 45 is reciprocally mounted upon the cylindrical conduit 42 and is provided with an enlarged outer end portion providing a chamber 46 adapted to communicate with the port 44 of the conduit. The end of the sleeve valve desirably is provided with an annular rib 48 which engages the interior face of an annular pressure actuated valve 47 which likewise is reciprocally mounted upon the cylindrical conduit 42. The rib 48 desirably is provided with a narrow recess 49 of such cross sectional area as will permit a desired restricted flow of the liquid from the sleeve valve chamber 46 into the casing of the initial-pressure relieving device. A port 50 which communicates with the interior of the pressure relieving device casing permits the liquid to flow from the casing into the reservoir. The sleeve valve 45 is normally held in engagement with the annular valve 47 by a spiral spring 45$^x$ one end of which engages a flange on the sleeve valve and the other end of which engages a shoulder of the nipple. Sufficient clearance is provided by the flange of the sleeve valve and the surrounding skirt of the annular valve to permit the liquid to flow quite freely therethrough when the sleeve valve is removed by the pressure of the liquid from engaging with the annular valve.

The outer wall of cylindrical conduit 42 is provided with a recessed or slabbed off portion 51 adjacent to its outer end to permit liquid to flow from the chamber 46 of the sleeve valve into the pressure chamber 52 in one end of the cylindrical casing 33 of the initial-pressure relieving device so that pressure is built up in the chamber against the outer face of the annular valve 47.

The skirt 8 of the piston is cut away preferably from the lower end thereof at a distance well above the port 39 in which the initial-pressure relieving device is seated so that the initial-pressure device will constantly be in communication with the cylinder.

In the operation of the device, a sudden compressive movement of the piston builds up pressure in the cylinder and the liquid therein is forced through the conduit 42 and its port 44 into the chamber 46 of the sleeve valve. If such increase in pressure is not considerable, a restricted amount of the liquid will flow from the chamber 46 through the port in the rib 48 into the chamber of the casing 33 and thence through port 50 into the reservoir. Thus the initial relieving device will act to restrain very slight movements of the piston. If the sudden movement of the piston produces considerable pressure in the cylinder, the liquid will flow through the port 44 of the conduit 42 more rapidly than it can be discharged through the port 49 in the ring 48 of the sleeve valve. The sleeve valve will thereupon yield to such pressure, thus permitting the escape of a considerable quantity of liquid around the periphery of the sleeve valve, thereby reducing the resistance to the sudden initial movement of the piston. The pressure thus produced by the flow of liquid through the port 44 of the conduit 42 into the chamber 46 of the sleeve valve will build up pressure in such chamber, and will cause the liquid to be forced through the passage 51 provided by the slabbed off portion of the outer wall of the conduit 42 into the pressure chamber 52 in the end of the casing of the initial-pressure device. The pressure thus built up in the chamber 52 will force the annular valve 47 along the tubular conduit 42 and will gradually close the port 44 and at the same time will compel the valve 47 again to engage the ring 48 on the end of the sleeve valve. This movement of the annular valve 47 will progressively throttle the port 44 and thereby build up a progressively increased resistance to the flow of liquid from the cylinder. This movement of the valve 47 will continue until the flow of liquid through the port 44 of the conduit 42 and the port 49 in the rib of the sleeve valve and the flow of liquid through the aperture 51 into the chamber 52 is so balanced as to provide a substantially constant pressure in the chamber 52, whereby the initial pressure relieving device will maintain a substantially uniform restriction of the fluid flowing from the cylinder. Further compressive movement of the piston will then displace the supplementary relief valve 25, and thereupon the restricted flow of liquid through the port 26 will exert the usual resistance to the further continued movement of the piston.

By reason of the construction above described, therefore, relatively light resistance will be offered to the initial movement of the piston, and such resistance will be progressively increased during the continued movement of the piston for a predetermined period after which such resistance to its movement will remain substantially constant until and unless further relieved by the action of the usual relief valve of the shock absorber.

It will be obvious that an initial-pressure relieving device embodying the invention herein disclosed may be mounted upon any suitable part of the cylinder wall or upon the piston head. It will also be understood that the particular embodiment of the invention disclosed herein is of an illustrative character, and that various changes in form, construction and arrangement of the parts may be made within the scope of the claims. It will also be understood that the principle of the invention herein disclosed is applicable to other types of shock absorbers or fluid pressure chambers within the meaning and scope of the claims.

Having thus described the invention, what is claimed as new, and desired to be secured by Letters Patent, is:

1. A hydraulic shock absorber for cushioning the movement of two relatively movable members, comprising a compound valve having yieldable means operable to relieve the initial resistance of the shock absorber to a sudden relative movement between said members and pressure operable means acting to produce, for a predetermined period of time, progressively increasing resistance to continued relative movement of said members.

2. A hydraulic shock absorber for cushioning the movement of two relatively movable members, comprising a compound valve having yieldable means operable to relieve the initial resistance of the shock absorber to a sudden relative movement between said members and pressure operable means acting to produce, for a predetermined period of time, progressively increasing resistance to continued relative movement of said members and thereafter acting conjointly with said yieldable means to maintain the increased resistance thus attained substantially constant during further continued movement of said members.

3. A hydraulic shock absorber for cushioning the movement of two relatively movable members, comprising a compound valve having yieldable means operable to relieve the initial resistance of the shock absorber to a sudden relative movement between said members and pressure operable means acting to produce, for a predetermined period of time, progressively increasing resistance to continued relative movement of said members and thereafter acting conjointly with said yieldable means to maintain the increased resistance thus attained substantially constant during further continued movement thereof, and supplemental means for reducing the resistance of the shock absorber to a force exceeding a predetermined amount.

4. A shock absorber for cushioning the movement of two relatively movable members, comprising a fluid containing cylinder connected to one of said members, and a piston connected to the other member, a compound valve having a spring controlled member yieldable initially to release fluid from said cylinder in response to a sudden movement of said piston and a member operable by continued pressure of the fluid in said cylinder progressively to restrict the flow of said fluid from said cylinder during continued movement of the piston.

5. A shock absorber for cushioning the movement of two relatively movable members, comprising a fluid containing cylinder connected to one of said members, and a piston connected to the other member, a compound valve having a spring-controlled member yieldable initially to release fluid from said cylinder in response to a sudden movement of said piston and a member operable by continued pressure of the fluid in said cylinder progressively to restrict the flow of fluid from said cylinder during continued movement of the piston for a predetermined period of time and thereafter acting in cooperation with said spring-controlled member to maintain a substantially uniform restriction to said flow during further continued movement of the piston.

6. A shock absorber for cushioning the movement of two relatively movable members, comprising a fluid containing cylinder connected to one of said members, and a piston connected to the other member, spring controlled means operable initially to release fluid from said cylinder in response to a sudden movement of said piston and means operable by pressure of the fluid in said cylinder progressively to restrict the flow of fluid from said cylinder during continued movement of the piston for a predetermined period of time and thereafter acting in cooperation with said spring-controlled means to maintain a substantially uniform restriction to said flow during further continued movement of the piston, and a supplemental spring-actuated relief valve operable by the pressure in the cylinder in excess of a predetermined amount to permit a restricted flow of liquid from the cylinder.

7. A shock absorber comprising a liquid-containing cylinder and a piston reciprocable therein, means for freely admitting liquid to said cylinder upon movement of the piston in one direction, and means for restricting the flow of liquid from the cylinder upon movement of the piston in the other direction, including an initial-pressure relieving device communicating with said cylinder comprising a conduit having a port, a spring-actuated valve yieldable upon sudden increase of pressure in said cylinder due to initial rapid movement of the piston to permit the liquid to flow through said port, and a cooperating valve operable by said increased pressure during continued movement of the piston progressively to close said port and thereby to increase the resistance of the liquid to the movement of the piston.

8. A shock absorber comprising a liquid-containing cylinder and a piston reciprocable therein, means for freely admitting liquid to said cylinder upon movement of the piston in one direction, and means for restricting the flow of liquid from the cylinder upon movement of the piston in the other direction, including an initial-pressure relieving device communicating with said cylinder comprising a conduit having a port, a spring-actuated valve yieldable upon sudden increase of pressure in said cylinder due to initial rapid movement of the piston to permit the liquid to flow through said port, and a cooperating valve operable by said increased pressure during continued movement of the piston progressively to close said port and thereby to increase the resistance of the liquid to the movement of the piston, and a supplemental relief valve acting to permit a restricted flow of liquid from said cylinder when the pressure therein exceeds a predetermined amount.

9. A shock absorber comprising a liquid-containing cylinder and a piston reciprocable therein, means for freely admitting liquid to said cylinder upon movement of the piston in one direction, and means for restricting the flow of liquid from the cylinder upon movement of the piston in the other direction, including an initial-pressure relieving device, comprising a tubular conduit communicating with said cylinder and having a lateral port, an annular restriction valve for said port slidably mounted upon said conduit, a cylindrical pressure chamber enclosing said annular valve, a sleeve valve slidably mounted upon said conduit having a chamber communicating with said port and provided with a restricted discharge aperture, a spring acting normally to hold said sleeve valve in contact with said annular valve, and means permitting a restricted flow of fluid from the chamber of said sleeve valve to said pressure chamber, whereby sudden increase in pressure in said cylinder will first displace said sleeve valve permitting liquid to flow from said cylinder and the increased pressure in said sleeve valve chamber will cause a restricted flow of liquid into said pressure chamber, thereby causing said annular valve gradually to close said port.

10. A shock absorber comprising a liquid-containing cylinder and a piston reciprocable therein, means for freely admitting liquid to said cylinder upon movement of the piston in one direction, and means for restricting the flow of liquid from the cylinder upon movement of the piston in the other direction, including an initial-pressure relieving device, comprising a tubular conduit communicating with said cylinder and having a lateral port, an annular restriction valve for said port slidable mounted upon said conduit, a cylindrical pressure chamber enclosing said annular valve, a sleeve valve slidable mounted upon said conduit having a chamber communicating with said port and provided with a restricted discharge aperture, a spring acting normally to hold said sleeve valve in contact with said annular valve, and means permitting a restricted flow of fluid from the chamber of said sleeve valve to said pressure chamber, whereby sudden increase in pressure in said cylinder will first displace said sleeve valve permitting liquid to flow from said cylinder and the increased pressure in said sleeve valve chamber will cause a restricted flow of liquid into said pressure chamber, thereby causing said annular valve gradually to close said port, and a supplementary relief valve operable by the increased pressure in said cylinder to permit a restricted discharge of the liquid therefrom.

11. An initial-pressure relieving unit for a fluid pressure chamber comprising a casing having a conduit adapted to be connected to said pressure chamber provided with a relief port for the fluid in said chamber and cooperating valve for controlling the flow of fluid from said port operable to permit a relatively free flow of fluid from said chamber upon sudden increase of pressure therein and thereupon operable progressively to restrict such flow during a predetermined period of time.

12. An initial-pressure relieving unit for a fluid pressure chamber comprising a casing having a conduit adapted to be connected to said pressure chamber, provided with a relief port for the fluid in said chamber and cooperating valves for controlling the flow of fluid from said port operable to permit a relatively free flow of fluid from said chamber upon sudden increase of pressure therein and thereupon operable progressively to restrict such flow during a predetermined period of time and thereafter to maintain a substantially uniform resistance to the flow of fluid from said pressure chamber.

13. An initial-pressure relieving unit for a fluid pressure chamber, comprising a closed cylindrical casing having a conduit adapted to be connected to said pressure chamber, an annular valve for said port reciprocally mounted upon said conduit and slidably fitting said casing, a spring actuated sleeve valve mounted on said conduit, normally engaging said annular valve and having a chamber communicating with said port adapted when displaced from said annular valve to permit fluid to flow into said casing, means for permitting escape of fluid from said casing and means for causing the pressure of the fluid in said chamber to actuate said annular valve.

14. An initial-pressure relieving unit for a fluid pressure chamber, comprising a closed cylindrical casing having a conduit adapted to be connected to said pressure chamber, an annular valve for said port reciprocally mounted upon said conduit and slidably fitting said casing, a spring actuated sleeve valve mounted on said conduit, normally engaging said annular valve and having a chamber communicating with said port adapted when displaced from said annular valve to permit fluid to flow into said casing, means for permitting escape of fluid from said casing and means for causing the pressure of the fluid in said chamber to actuate said annular valve, comprising a pressure chamber in the closed end of the casing and a passage leading from the chamber of the sleeve valve to said valve pressure chamber.

15. An initial-pressure relieving device comprising a cylindrical casing closed at one end and having detachably secured at its other end an externally screw-threaded nipple adapted to be connected to the wall of the pressure chamber and provided with a lateral port and presenting a shouldered internal rib, a tubular conduit at one end and an external flange engaging said rib, provided with a lateral port adjacent at its opposite end, resilient means for holding said shoulder in engagement with said rib, an annular valve for said port slidably engaging said conduit and said casing, a spring actuated sleeve valve slidably mounted upon said tubular conduit, having a recessed rib normally engaging said annular valve, and a passage leading from the sleeve valve to the chamber of said casing beyond said annular valve.

In testimony whereof, I have signed my name to this specification.

RALPH M. LOVEJOY.